United States Patent [19]
Fiedrich et al.

[11] Patent Number: 6,009,612
[45] Date of Patent: Jan. 4, 2000

[54] APPARATUS FOR ATTACHING RADIATING PLATE TO HOLDERS OF MODULAR UNIT FOR RADIANT FLOOR AND WALL HYDRONIC HEATING SYSTEMS

[76] Inventors: Joachim Fiedrich, 20 Red Pine Dr., Carlisle, Mass. 01730; Robert Lagace, 186R Bear Rock Rd., Durham, Conn. 06422

[21] Appl. No.: 08/746,458

[22] Filed: Nov. 12, 1996

[51] Int. Cl.[7] .................................................. B23P 11/00
[52] U.S. Cl. ........................... 29/432.2; 29/798; 30/366; 83/30; 83/660; 72/325
[58] Field of Search .................................. 29/798, 432.1, 29/432.2, 254, 432; 81/463; 30/366; 83/660, 30; 72/324, 325

[56] References Cited

U.S. PATENT DOCUMENTS

| | | | |
|---|---|---|---|
| 402,240 | 4/1889 | Hayes . | |
| 1,685,287 | 9/1928 | McEvoy, Jr. . | |
| 1,837,451 | 12/1931 | Lee . | |
| 2,653,664 | 9/1953 | Dolby . | |
| 3,062,140 | 11/1962 | Bishop . | |
| 3,685,336 | 8/1972 | Black, Jr. | 72/325 |
| 4,364,406 | 12/1982 | Bohlin | 72/325 |
| 4,369,836 | 1/1983 | Bleckman | 29/432 |
| 4,394,794 | 7/1983 | Shirey | 29/432 |
| 5,517,744 | 5/1996 | Moser et al. | 83/30 |
| 5,661,993 | 9/1997 | Black, Jr. | 72/325 |

FOREIGN PATENT DOCUMENTS

| | | | |
|---|---|---|---|
| 99162 | 1/1984 | European Pat. Off. | 29/432 |

*Primary Examiner*—David P. Bryant
*Attorney, Agent, or Firm*—Robert T. Dunn, Esq.

[57] ABSTRACT

A technique of attaching a thermally conductive metal plate or sheet to a flat surface of wood holders in a process of fabricating modular unit radiation panels for mounting in a floor or a wall of a room of a building heated by a hydronic heating system that pumps hot water through tubing that is held by said modular units for RFH or RWH, respectively, wherein the modular unit is an assembly of the thermally conductive metal plate or sheet having length, width and thickness and the wood holders are two flat wood boards evenly spaced apart to provide a slot in which said tubing is inserted and held against said metal plate or sheet, using a tool having a base and a point so configured that, the tool point thrust into the modular unit through the metal plate or sheet into the holder makes a hole in the holder and cuts a tab of the metal from the sheet that is embedded into the hole, the free end of the tab being wider than the end thereof attached to the metal plate or sheet and the free end of the tab being wider than the hole in the holder at the holder surface.

14 Claims, 4 Drawing Sheets

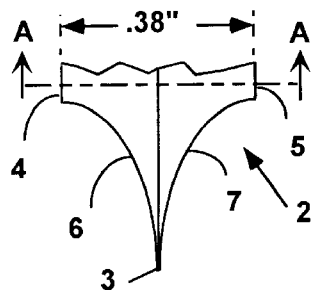
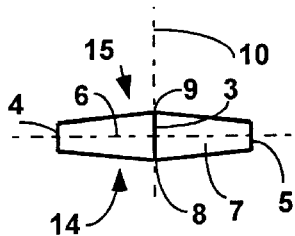
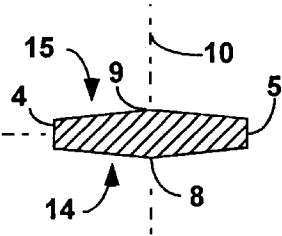
FIG 1     FIG 2     FIG 3
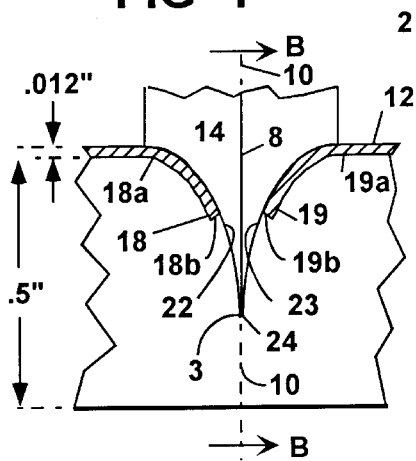
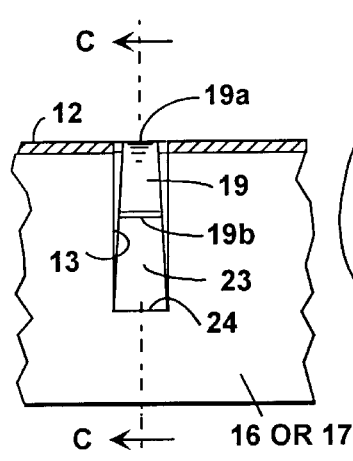
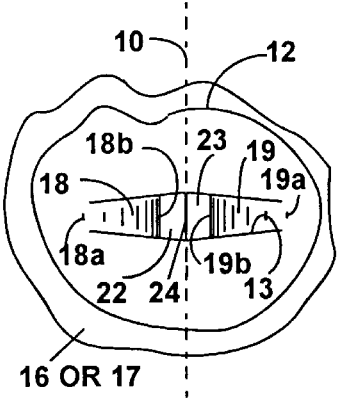
VIEW CC     VIEW BB     (TOP VIEW)
FIG 4     FIG 5     FIG 6
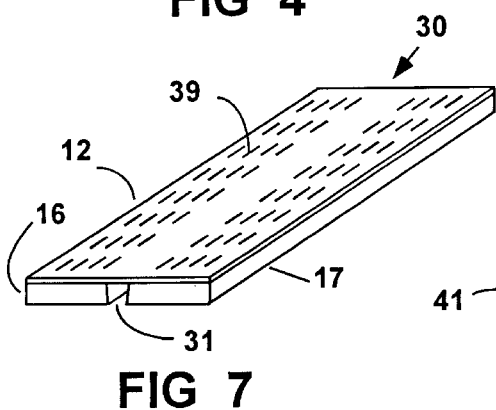
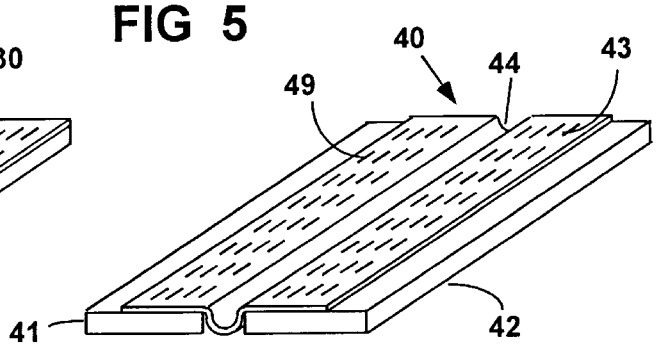
FIG 7     FIG 8

VIEW DD

APPARATUS FOR ATTACHING RADIATING PLATE TO HOLDERS OF MODULAR UNIT FOR RADIANT FLOOR AND WALL HYDRONIC HEATING SYSTEMS

BACKGROUND OF THE INVENTION

This invention relates to hydronic heating systems and more particularly to apparatus and a method of attaching a radiating plate to holders to fabricate a modular unit for installing hot water tubing of radiant floor and wall hydronic heating systems.

Radiant Floor and Wall Hydronic Heating

Radiant floor heating (RFH) and radiant wall heating (RWH) are techniques of heating rooms in a dwelling or commercial building for human and creature comfort. It is believed by many that radiant heating is the ideal way to warm the human body.

Radiant heating warms the surfaces of a room: the floor, the walls, the furniture, which become heat sinks, slowly giving off their warmth to the cooler surroundings. People and creatures in the room then absorb this heat as needed. It can be compared to walking barefoot on warm earth that has been heated by the rays of the sun when surrounding air temperature is cool, however, as long as there is no breeze, one feels comfortably warm. Furthermore, in a radiant heating system, the warm temperatures are kept at floor level and radiate upwards; and, since there is no circulating air, there is not a hot pocket of air formed at the ceiling level. With radiant floor heating, one actually experiences cooler temperatures at head level and warmer temperatures at foot level which results in comfort and warmth.

In these systems, water heated in a boiler is distributed to heating loops of tubing in the dwelling that carry the heat by radiation, conduction and convection to the rooms in the dwelling. A common technique provides a boiler hot water supply feeding the supply header of the heating loops and the boiler water return to which the return header of the heating loops connects. The return water is heated in the boiler and sent out again as hot supply water, and so the water is cycled through the essentially closed system. One or more water pumps in this system keep the water flowing and valves control water flow rates through the loops depending on demand.

In such RFH and RWH systems and other hydronic heating systems using wall radiators and/or baseboard finned tubing elements, the supply water temperature from the boiler must be controlled so that it does not exceed certain limits that are substantially lower than the usual boiler supply water temperature. There are several reasons for this: the floor or wall must not be uncomfortable hot; and where the tubing is plastic, the water temperature for some plastic materials must not exceed about 140° F., although good quality "cross-linked" polyethylene tubing can carry water at temperature in excess of 140° F. without any deterioration of the tubing or the tubing oxygen barrier.

The design criteria of plastic tubing for RFH and RWH system applications is determined by a number of important factors to insure an absolutely safe and reliable tubing and many of these requirements are dictated by the usual practice of embedding the tubing in a layer of concrete. They are design criteria that are outlined and specified in the ASTM standards (American Society for Testing and Materials) and are achieved while still retaining a flexible and workable plastic tubing as an end product. That tubing is called PEX, which is short for "Polyethylene Cross-Linked". PEX has been synonymous with plastic heating pipe in Europe for several decades and has a track record that has made it the plastic tubing of choice for hydronic heating applications. Long term bench tests, which simulate 30 years of continuous use, in addition to accelerated testing which projects pipe performance well in excess of 30 years has confirmed the excellent long term real service life track record of PEX. Crossed-linked polyethylene tubing is now, after 20 years of use and improvements, the most widely accepted pipe material in the European plumbing industry for both heating and plumbing applications.

The boiler must be operated at a sufficiently high water temperature (over 160° F.) to avoid flue gas condensing, the supply water temperature to the heating loops must be reduced to no more than 110° F. so that the heated floor or wall is not uncomfortable to stand on or touch, the heating loop tubing must be PEX quality or better and have an oxygen barrier and the tubing must be sufficiently flexible that it can be inserted in place with ease and not require special skills and equipment to install.

Heretofore, these requirements have been met using a hydronic heating system having supply water temperature control such as described in the applicant Joachim Fiedrich's U.S. Pat. No. 5,119,988, issued Jun. 9, 1992, entitled "Hydronic Heating Water Temperature Control System", or other suitable supply water temperature controls, to feed one or more heating loops of PEX tubing that is embedded in a layer of special concrete three to six inches thick that serves as the floor or wall of a room to provide RFH or RWH heat in that room.

Installation in Concrete—"Wet" Installation

A heating loop may include several heating elements like wall mounted radiators and/or baseboard finned tubing that are the principal heat exchangers of the loop, or the tubing itself may be the principal heat exchanger of the loop. In the latter case the tubing is usually buried in a layer of concrete that forms the floor of a room (as mentioned above) and so the tubing heats the concrete slab, which is the floor. The concrete that the tubing is buried in is a special kind for the purpose and the heat exchange is principally by conduction and radiation to the concrete, which in turn heats the room by some conduction and convection, but principally by radiation. Hence, this type of heating is called Radiant Floor Heating (RFH). Similarly, the tubing is sometimes mounted in a wall embedded in a layer of concrete and this is called Radiant Wall Heating (RWH).

Installation of the PEX tubing embedded in concrete requires special skills and tools and is relatively expensive. Also there must be suitable support structure as the concrete adds considerable weight. This technique of installing the tubing in wet concrete or cement is sometimes called a "wet" installation and requires special equipment and working skills to hold the tubing in place, and in the case of RFH, pour the wet concrete to cover the tubing by an inch or more and finish the concrete surface when it sets. For a wall installation, special skills are required to spread a special wet cement or plaster mix over the tubing that has been attached to the wall and then finish the wall, usually with a wet white plaster mix. These "wet" installations depend upon the direct conduction of heat from the tubing into the concrete or plaster, raising the temperature of the concrete or plaster, which in turn radiates heat into the room. For such RFH and RWH installations, radiation into the room is entirely dependent upon the heat from the tubing flowing by conduction to the concrete or plaster. For such RFH installations, there is often no adequate thermal barrier under the concrete, particularly when the concrete floor is supported directly by gravel, sand or earth.

Installation in Modular Unit Radiation Panels "Dry" Installation

The applicant Joachim Fiedrich in the present application has developed and patented methods and means of providing hydronic RFH and RWH with all of the benefits thereof without embedding the loop tubing in concrete, cement or plaster, or the like, for new construction and old construction. That invention is called "Dry Installation" and is described in his U.S. Pat. No. 5,292,065, issued Jun. 30, 1992, entitled "Radiant Floor And Wall Hydronic Heating Systems". That patent describes a modular unit that is an assembly of a thermally conductive plate and holding pieces that are spaced apart boards, so assembled that the plate and the spaced apart edges of the boards form a longitudinal slot into which the tubing fits snugly and is held longitudinally therealong in contact with the plate.

At installation, the modular units (assemblies of a plate and two spaced apart boards) are arranged in line and attached by nailing to the sub-flooring for RFH, or the wall studs for RWH, ready for insertion of the length of tubing (of a heating loop) in the aligned slots of the modular units. Next, a resilient filler material or caulk is injected into the exposed slot and then the tubing is inserted laterally into the slot forcing the filler material to completely fill the slot around the tubing, particularly between the tubing and the plate and serves to hold the tubing in the slot allowing some movement therebetween as might occur due to uneven thermal expansions and provides a heat conducting path from the tubing to the plate.

Following such insertion, the installation is ready for a finishing floor or wall covering. Thus, RFH or RWH is installed "Dry" (without wet concrete, cement or plaster) and can be accessed later by simply removing the finishing floor or wall covering.

Heretofore, the plate has been assembled with the two boards to provide a modular unit using an epoxy adhesive. That technique, while effective requires several steps in fabrication and handling a volatile epoxy adhesive.

SUMMARY OF THE INVENTION

It is an object of the present invention to provide a method and means of fabricating modular unit radiation panels for "Dry" Installation of hydronic RFH and RWH tubing.

It is an object of the present invention to provide a method and means of fabricating modular unit radiation panels for "Dry" Installation of hydronic RFH and RWH tubing wherein the modular units are an assembly of a radiating metal plate or sheet and a holder for holding the tubing and the metal plate or sheet in intimate thermal contact.

It is a further object to provide such a method and means of fabricating modular unit radiation panels for "Dry" Installation of hydronic RFH and RWH wherein use of an epoxy adhesive to attach the metal plate or sheet to the holder is avoided.

It is a further object to provide such a method and means of fabricating modular unit radiation panels for "Dry" Installation of hydronic RFH and RWH wherein the metal plate or sheet is mechanically attached to the holder.

It is a further object to provide such a method and means of fabricating modular unit radiation panels for "Dry Installation" of hydronic RFH and RWH wherein the metal plate or sheet is mechanically attached to the holder without additional parts for the attachment.

It is another object that the mechanical attachment improve heat transfer from the metal plate or sheet of the modular unit radiation panel to the holder boards of the panel, which hold the heat as a heat sink and feed the heat by conduction to the finished flooring or wall for RFH or RWH, respectively.

It is another object that the mechanical attachment improve heat transfer from the metal plate or sheet to the floor or wall for RFH or RWH, respectively.

The present invention has application to a hydronic heating system for RFH in which the modular unit radiation panels are mounted on top of or under the rough floor. Furthermore it has application where the metal plate is simply flat (referred to herein as the first type modular unit) or contains a groove formed in it into which the tubing is inserted so that the plate substantially "wraps" around the tubing (referred to herein as the second type modular unit). Both of these types and other variations of the modular unit radiation panel are described in the applicant Joachim Fiedrich's aforementioned U.S. Pat. No. 5,292,065.

For the first type modular unit radiation panel, in particular, the spacing between the boards and the plate attached to the boards define a slot into which the tubing fits snugly and is held therein in intimate thermal contact with the plate by a resilient filler material as described in the applicant's aforementioned U.S. Pat. No. 5,292,065 and also described in the applicant Joachim Fiedrich's co-pending U.S. patents/applications: U.S. Pat. No. 5,579,996, entitled "Radiant Floor And Wall Hydronic Heating Systems"; Ser. No. 08/500,069, filed Jul. 10, 1995, entitled "Radiant Floor And Wall Hydronic Heating System Tubing Attachment To Radiant Plate"; and Ser. No. 08/502,976, filed Jul. 17, 1995, entitled "Radiant Floor And Wall Hydronic Heating Systems".

According to specific embodiments of the present invention as applied to both the first and second types of modular unit radiation panel, the plate is formed of a sheet of aluminum, the holder is comprised of uniformally spaced apart rigid boards of wood or other material that can be attached by nails, screws, staples, etc., or adhesive epoxy, to rough flooring and walls. The sheet of aluminum is attached to the boards by a specially contoured staking tool or punch that is driven by, for example, an air press through the aluminum and about half way through the adjacent holder board, leaving an elongated hole a fraction of an inch long and embedding one or more tabs or strips of the aluminum into the board, so that the free end of the tab (the embedded end) is wider than the attached end, making it most difficult to pull the aluminum sheet from the holder board without tearing the sheet away from the tabs. A staking pattern of rows over the sheet of aluminum where it contacts the boards completes the attachment.

BRIEF DESCRIPTION OF THE DRAWINGS

FIG. 1 is an enlarged front view of the staking tool;

FIG. 2 is an enlarged bottom view of the staking tool;

FIG. 3 (view AA) is an enlarged cross-section bottom view of the staking tool, taken as cross-section AA in FIG. 1;

FIG. 4 (view CC) is an enlarged cross section front view of a part of a modular unit radiation panel (of either type), taken as cross-section CC in FIG. 5, showing the staking tool front view penetration of the panel through the aluminum sheet into the wood holder and the two tabs of aluminum cut by the tool and embedded into the wood;

FIG. 5 (view BB) is another enlarged cross section end view of a part of the same modular unit radiation panel, taken as cross-section BB in FIG. 4, showing the transverse view of the hole made by the penetration through the aluminum sheet into the wood holder and the one of tabs of aluminum cut by the tool and embedded into the wood, after the tool is removed;

FIG. 6 is an enlarged top view (from the aluminum sheet side) a modular unit radiation panel (of either type) showing the hole created by the staking tool penetration through the aluminum sheet into the wood holder, the two strips of aluminum cut by the tool and embedded into the wood and the bottom of the hole in the wood holder produced by the tool penetration;

FIG. 7 is a top perspective view of a modular unit radiation panel of the first type showing the rows of penetrations by the staking tool over the sheet of aluminum where it contacts the boards to complete the attachment;

FIG. 8 is a top perspective view of a modular unit radiation panel of the second type showing the rows of penetrations by the staking tool over the sheet of aluminum where it contacts the boards to complete the attachment;

DESCRIPTION OF EMBODIMENTS OF THE INVENTION

Figure 9:
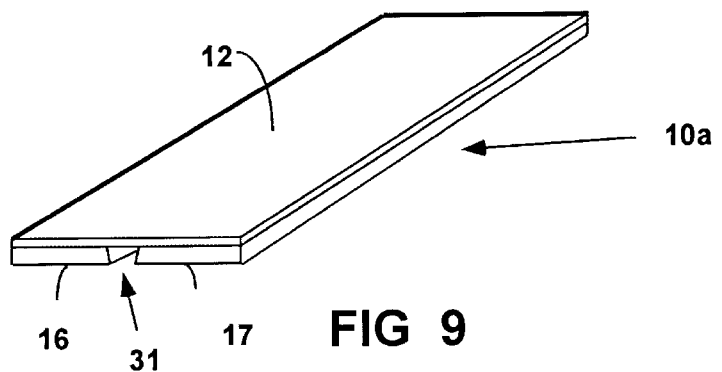
FIG. 9 is the same as FIG. 7, a top perspective view of a modular unit of the first type, before attachment of the aluminum to the holder boards by staking.

FIGS. 1 to 8 illustrate the technique of the present invention for attaching the radiating aluminum plate or sheet to the holder boards in the assembly of a modular unit radiation panel of the first type, the second type or any other type that may be conceived wherein a plate or sheet of aluminum, or other thermally conductive metal as malleable as aluminum, such as copper, is attached to a holder surface that can be penetrated like wood and can be attached to rough flooring in a room of a dwelling by nails, screws, staples, etc the way wood can be attached. FIGS. 1 to 4 show the staking tool and FIGS. 4 to 6 show the hole through the aluminum sheet and into the board whereby the sheet is fixedly attached to the board.

The point 3 of the staking tool 2 is shown in FIGS. 1, 2 and 4. As viewed from the point end in FIG. 2 and also in cross-section in FIG. 4, the staking tool imprint is elongated and generally rectangular in shape, so that it makes a generally rectangular hole 13 (see FIGS. 5 and 6) through the aluminum sheet 12 into the wood board, 16 or 17, about a quarter of an inch into the board. The penetration is made by chisel-like point 3 of the tool which is the first part of the tool to cut through the aluminum sheet.

From the parallel sides 4 and 5 of the tool body, the tool point sides 6 and 7 abruptly curve inward toward the center of the tool asymptotically approaching the transverse plane of symmetry 10 of the tool, in which peaks 8 and 9 in the front 14 and rear 15 faces, respectively, lie. The peaks 8 and 9 of the front face 14 and rear face 15, respectively, of the tool point make the point 3 wider than the sides 4 and 5.

FIG. 4 illustrates the tool driven a suitable depth through the aluminum sheet 12 into the board 16 or 17. When this is done tabs 18 and 19 of the aluminum sheet are cut and forced into the hole 13 in the board. These tabs 18 and 19 are forced against the sloping sides 22 and 23, respectively of the hole 13 that meet at the bottom 24 of the hole. Since the point 3 of the tool is wider than the sides 4 and 5, the free end of each tab, 18b for tab 18 and 19a for tab 19, is wider than the attached end, 18a for tab 18 and 19a for tab 19. Also, importantly, the free end of each tab is wider than the sloping side of the hole in the board (sloping side 22 for tab 18 and 23 for tab 19) that the tab must be pulled from in order to pull the tab out of the hole. As a consequence, this technique including the staking tool structure and its use effects a very secure attachment of the aluminum sheet to the board. In fact, the sheet cannot be pulled away from the board except by tearing loose the tabs from the sheet.

The structure and method of attaching the aluminum sheet to the board, described above for a single staking is repeated over the whole of the aluminum sheet 12 that is contiguous with one or the other of the holding boards 16 and 17 forming several rows of the staking attachments. As shown in FIG. 7 for a modular unit heating radiation panel 30 of the first type the rows 39 are comprised of staking holes end to end. Similarly, as shown in FIG. 8 for a modular unit heating radiation panel of the second type 40 the rows 49 are comprised of staking holes end to end. Clearly for either type panel the staking holes in a row may be side by side or in any kind of alternating arrangement desired.

Modular Units of the First Type

Figure 10:
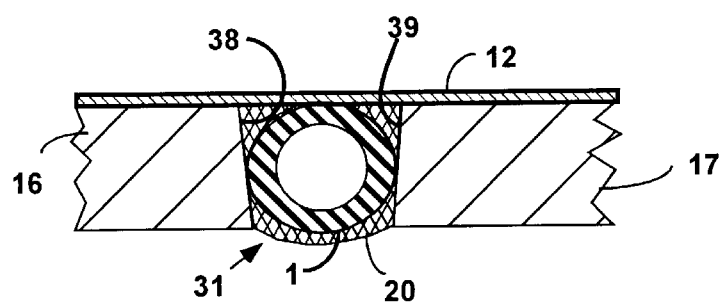
FIG. 10 is an enlarged end view of the modular unit of the first type with a resilient filler material of caulking or epoxy adhering the tubing against the plate in intimate thermal contact therewith.

A configurations of a module unit of the first type is shown in detail in FIGS. 9 and 10. A typical modular unit of this type, denoted 30, is comprised of two lengths 16 and 17 of plywood, particle board or other rigid material, about the same thickness as the outside diameter of the tubing it is installed with. The two lengths 16 and 17 of holder pieces (herein also called sleepers) hold the metal heat conducting radiation plate 12 fixedly attached thereto provide a tubing containment slot 31 into which the tubing 1 is inserted against the plate as shown in FIG. 10 at installation.

As shown in FIG. 10, the tubing containment slot 31 is the space between sleeper pieces 16 and 17 and is closed on one side (the top side in FIG. 10) by plate 12 and so the tubing must be inserted into the slot from the opposite side of the space (the bottom side in FIG. 10). Thus, the open side of slot 31 is exposed for insertion of the tubing whether mounting is to the underside of the sub-flooring, as shown in FIG. 11, or to the top side of the sub-flooring as shown in FIG. 12.

Figure 11:
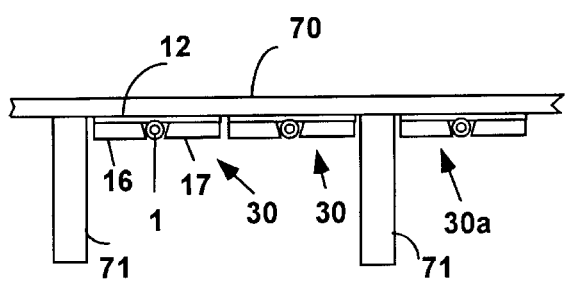
FIG. 11 is an end view an RFH installation where modular units of the first type are installed under the rough flooring between the floor joists of a room and tubing is inserted therein.

Installation of the modular units 30 and tubing 1 to the underside of the sub-flooring 70 of a room, as shown in FIG. 11, the sub-flooring being supported by floor joists, such as floor joist 71, the modular unit may first be stapled, nailed or otherwise firmly attached to the underside of the sub-flooring and then the tubing is inserted laterally into the slot 31 against the plates so that the tubing and the plates are in intimate thermal contact.

Figure 12:
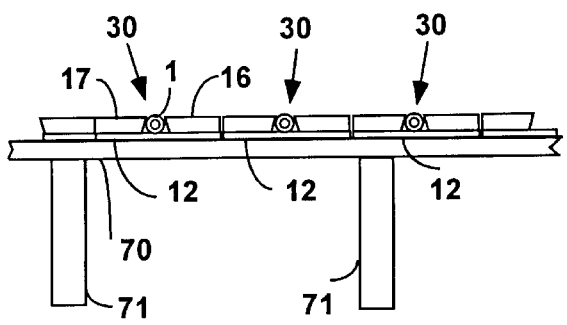
FIG. 12 is an end view an RFH installation where modular units of the first type are installed on top of the rough flooring of a room, abutting each other side by side and tubing is inserted therein.

Installation of the modular units 30 and tubing 1 on top of the sub-flooring 70 is shown in FIG. 12. The modular units 30 are first stapled, nailed or otherwise firmly attached to the underside of the sub-flooring, side by side and end to end abutting each other and then the tubing is inserted laterally into the slot 31 against the plates so that the tubing and the plates are in intimate thermal contact.

For this on top of the sub-flooring installation, the part of the sub-flooring in the room that is not completely covered by a modular piece of one type or the other must be brought up to the level of the part that is covered, by pieces such as 88.

The plate is made of highly thermally conductive material such as aluminum or copper. For example, it can be made of a sheet of .012 gage, 3005 alloy aluminum; and is attached to sleepers 16 and 17 by staking as described hereinabove.

For installations in wood frame construction where the spacing between floor joists and between wall studs is 16 inches on center, the modular unit size is made in consideration of that usual joist and stud spacing. For example, for the under floor installation shown in FIG. 11, two modular pieces must fit side by side in a bay between floor joists and the bay width is about 14½ inches. Therefore, the preferred width of the module piece is less than half of that, or between 6 and 7 inches. The length of the modular unit is preferably a whole multiple of 16 inches and preferably 32 or 48 inches.

The inside edges of the sleeper pieces define slot 31 into which the tubing is inserted and held against the plate. Those edges 38 and 39 (shown in FIG. 8) are preferably beveled as shown. The purpose of the bevel is to taper the space 14 so that it becomes wider toward the plate. Thus, the tubing must be forced into the slot from the open side thereof and once forced in is held firmly therein against plate 12. The tubing is further held securely in the slot in intimate thermal contact with the plate by an epoxy material 20, as is described further hereinbelow.

Modular Units of the Second Type

Figure 13:
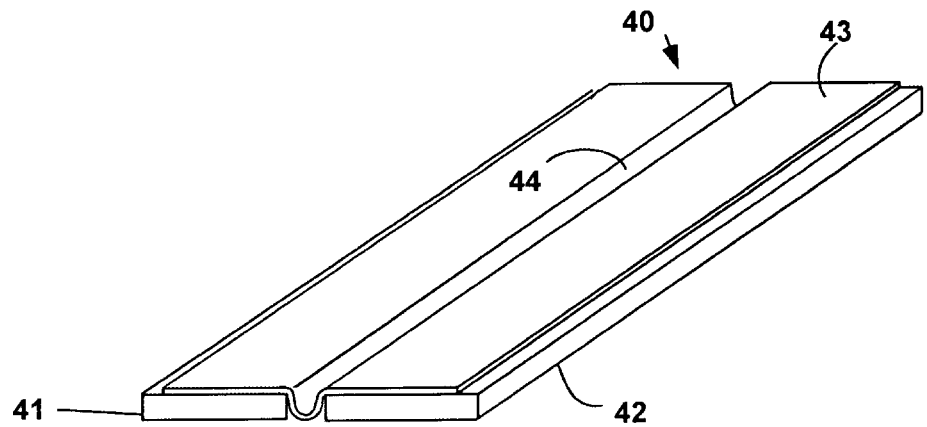
FIG. 13 is a perspective view of a modular unit of the second type before attachment of the aluminum to the holder boards by staking.
Figure 14:
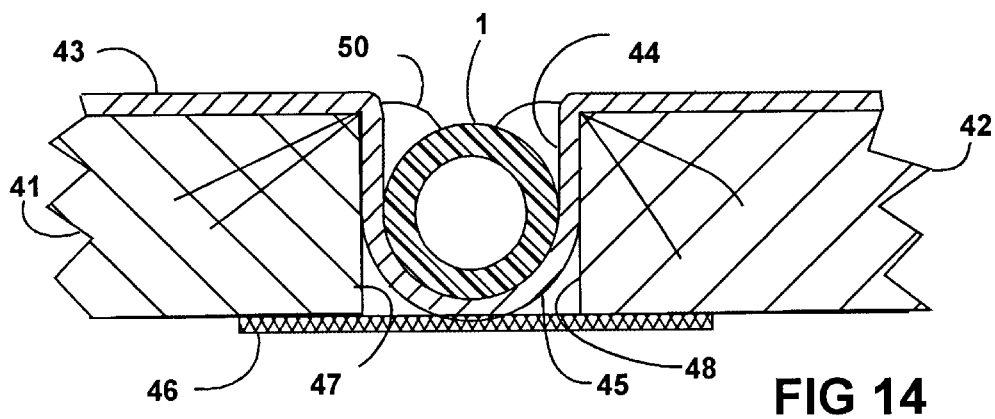
FIG. 14 is an enlarged end view of the modular unit of the second type showing the aluminum heat transfer plate with a longitudinal groove, the holder boards and a resilient filler material of caulking or epoxy adhering the tubing against the plate in intimate thermal contact therewith in the groove.
Figure 15:
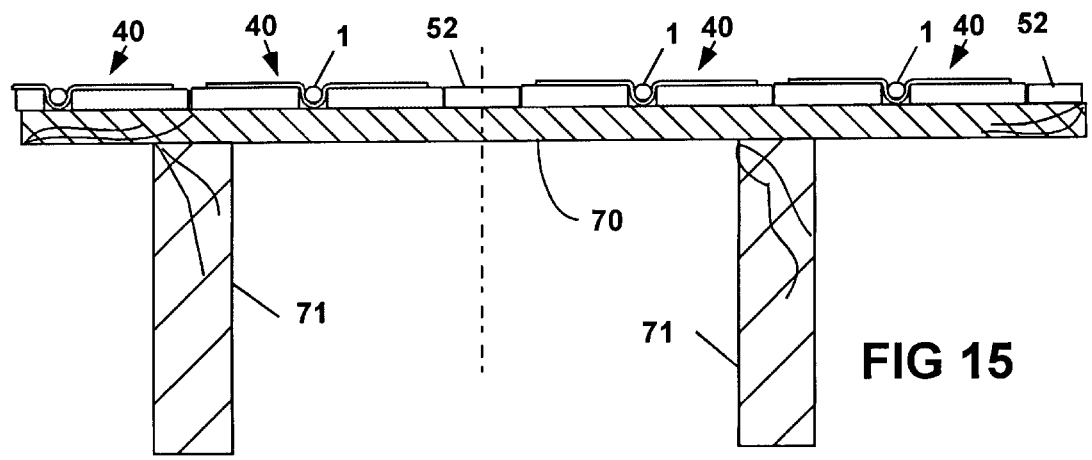
FIG. 15 is an end view of an RFH installation of modular units of the second type on top of the rough flooring in a room.

A configuration of a modular unit of the second type is shown in FIGS. 13 to 15. A typical modular unit 40 of this type is shown in FIGS. 13 and 14. It is composed of two lengths 41 and 42 of plywood, particle board or other rigid board-like material, about the same thickness as the outside diameter of the tubing it is to be installed with. The two lengths 41 and 42 (herein also called sleepers) hold the metal heat conduction and radiation plate or sheet 43, which has a longitudinal groove 44 the length thereof that fits snugly into slot 41, defined by the boards 41 and 42 and at installation, the tubing 1 fits snugly (or snaps) into the groove.

The sheet 43 is made of highly thermally conductive material such as aluminum or copper. For example, it can be made of a sheet as thin as .012 gage, 3005 alloy aluminum; and is attached to sleeper boards 41 and 42 by staking as described hereinabove. The groove 44 formed in such sheet aluminum can be easily distorted as the spacing between the two sleepers varies. To avoid this, a piece of reinforcing mat 46 may be attached to both sleeper boards, bridging the slot and so insuring a degree of lateral dimensional stability of the module unit parts. The mat 46 may be fiber glass reinforced flexible material that is attached by stapling to the sleeper pieces as shown. The completed modular unit 40, shown in FIG. 13 is substantially rigid longitudinally and can flex slightly along the groove 44.

The inside edges of the sleeper boards define the slot into which the groove in the plate fits. Those edges 47 and 48 may be parallel to each other and perpendicular to the plane of the modular piece as shown in FIG. 12 or they may be tapered so that it is slightly more narrow at the open end (the top as shown in FIGS. 11 and 12) where the tubing enters it and widens slightly toward the bottom thereof where the tubing is contained.

FIG. 15 is an end view of an RFH installation on top of the sub-flooring, 70, showing several modular pieces of the second type, arranged side by side and end to end on the sub-flooring, on an area thereof in a room.

Compliant Filler Around Tubing

A compliant filler and holding material around the tubing held in the slot 31 in the first type modular unit shown in FIG. 10 and denoted material 20, and around the tubing in the second type modular unit shown in FIG. 14 and denoted 50, in the first type is applied to the slot before the tubing is inserted and forced into the slot. For the second type, compliant filler is applied after the tubing is inserted and forced into the groove. A purpose of the filler material is to hold the tubing in the slot/groove as an adhesive, while at the same time allowing the tubing to expand and contract longitudinally within the slot/groove of successive modular units that hold a length of tubing at installation. The tubing must be free to expand and contract, while the modular units are fixed by staples, nails, screws, etc. to the sub-flooring. Another purpose of the filler material is to reduce noise created by expansions and contractions of the tubing in the slot/groove. Yet another important purpose is to provide a medium of thermal conduction from the tubing to the plate; and for that purpose it is important that the filler fill all voids between the tubing and the metal plate or sheet. A suitable filler material for any of these purposes is silicone rubber.

Improved Heat Transfer from Metal Sheet to Finished Floor

Figure 16:
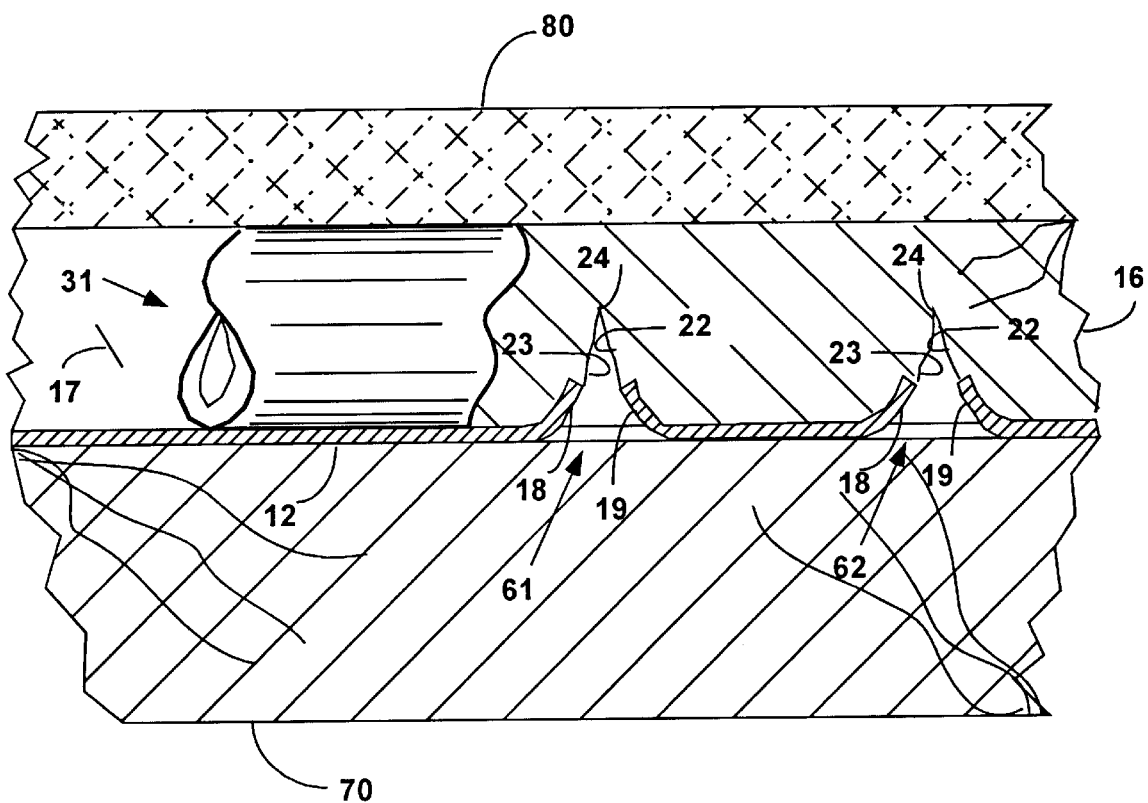
FIG. 16 is an enlarged cross-section view like FIG. 4, but with the staking tool removed, of a modular unit of the first type installed on top of the rough flooring as in FIG. 12, with the tubing inserted into the slot and a finished flooring installed on top and with part broken away to reveal the tubing and slot, illustrating improved heat transfer from the metal sheet to the finished floor for RFH.

FIG. 16 is an enlarged cross-section view like FIG. 4, but with the staking tool removed, of a modular unit of the first type installed on top of the rough flooring 70 as in FIG. 12, with the tubing 1 inserted into the slot 31 and a finished flooring 80 installed on top. In this Figure several staking holes 61 and 62 are shown end to end in the cross-section view. Also, part of the cross-section view is broken away to reveal the tubing and slot.

Each of the staking holes 61 and 62 shown has two tabs (18 and 19) of the aluminum sheet 12 embedded up into the hole in the holding board 16 toward the finished flooring 80. These tabs conduct heat from the aluminum sheet up into the wood holder board 16 and so raise the temperature of the board more than would occur, all else being the same, without the tabs. Thus, the tabs tend to heat the holder boards by conduction as well as firmly attaching the aluminum sheet to the boards.

By heating the holder boards 16 and 17 more heat is conducted from the holder boards to the finished flooring 80 in addition to radiation from the aluminum sheet and so heat transfer from the aluminum sheet to the finished floor for RFH is improved.

CONCLUSIONS

While the invention described herein is a method and means of attaching a metal plate or sheet to a surface of wood and is described in connection with several preferred embodiments of modular unit radiation panels for installation with heating loop tubing of hydronic RFH or RWH systems, it will be understood that it is not intended to limit the invention to those embodiments. It is intended to cover all alternatives, modifications, equivalents and variations of those embodiments and their features as may be made by those skilled in the art within the spirit and scope of the invention as defined by the appended claims.

We claim:

1. An apparatus for attaching a thermally conductive metal plate or sheet to flat surfaces of wood holders in a process of fabricating modular unit radiation panels for mounting in a floor or a wall of a room of a building heated by a hydronic heating system that pumps hot water through tubing that is held by said modular units for RFH or RWH, respectively, wherein said modular unit is an assembly of said thermally conductive metal plate or sheet having length, width and thickness and said wood holders are flat wood boards that provide a slot in which said tubing is inserted and held against said metal plate or sheet, comprising:

a tool having a base, a point, a front face, a rear face, two sides and two point sides extending from said base to said point, wherein said point defines a cutting edge extending from said front face to said rear face, and the length of said point edge is greater than the width of said point sides at said base, whereby said tool point thrust into said modular unit through said metal plate or sheet into one of said holders makes a hole in said holder and cuts a tab of said metal that is embedded into said hole, the free end of said tab being wider than the end thereof attached to said metal plate or sheet, and said free end of said tab being wider than said hole in said holder at said holder surface at said attached end of said tab.

2. The apparatus as in claim 1, wherein:

the width of one of said point sides increases from said base to said point.

3. The apparatus as in claim 2, wherein:

said point sides meet at said point.

4. The apparatus as in claim 3, wherein:

said one point side curves from said base toward said point as viewed from said front face.

5. The apparatus as in claim 4, wherein:

said curve is concave.

6. The apparatus as in claim 5, wherein:

said curve is asymptotic to said other point side at said point.

7. The apparatus as in claim 6, wherein:

said curve is asymptotic to said metal plate or sheet where said curve meets said base.

8. The apparatus as in claim 7, wherein:

said curve is perpendicular to the side at said base where said curve meets said base.

9. The apparatus as in claim 1, wherein:

said point edge is sharp to facilitate penetration through said metal plate or sheet.

10. The apparatus as in claim 1, wherein:

there is a plane of symmetry through said point parallel to said sides and said point edge lies in said plane of symmetry.

11. The apparatus as in claim 1, wherein:

the width of both of said point sides increases from said base to said point, said point sides meet at said point, both sides curve from said base toward said point as viewed from said front face, said curves are concave, said curves are asymptotic to each other at said point, said curves are asymptotic to said metal plate or sheet where said curves meet said base, and said point edge is sharp to facilitate penetration through said metal plate or sheet.

12. An apparatus for attaching a metal plate or sheet to a surface of a piece of wood, comprising:

a tool having a base, a point, a front face, a rear face and two sides extending from said base to said point, wherein said point defines a cutting edge extending from said front face to said rear face, and the length of said point edge is greater than the width of said sides at said base, whereby said tool point thrust through said metal plate or sheet into said piece of wood makes a hole in said piece of wood and cuts a tab of said metal that is embedded into said hole, the free end of said tab being wider than the end thereof attached to said metal plate or sheet, and said free end of said tab being wider than said hole in said piece of wood at said attached end of said tab.

13. A method of attaching a thermally conductive metal plate or sheet to flat surfaces of wood holders in a process of fabricating modular unit radiation panels for mounting in a floor or a wall of a room of a building heated by a hydronic heating system that pumps hot water through tubing that is held by said modular units for RFH or RWH, respectively, wherein said modular unit is an assembly of said thermally conductive metal plate or sheet having length, width and thickness and said wood holders are flat wood boards that provide a slot in which said tubing is inserted and held against said metal plate or sheet, including the steps of providing a tool having a base, a point, a front face, a rear face, two sides extending from said base to said point and a plane of symmetry through said point parallel to said sides, said point defining an edge lying in said plane of symmetry, said edge extending from said front face to said rear face and the length of said point edge being greater than the width of said sides; and thrusting said tool point into said modular unit through said metal plate or sheet into a holder, cutting a tab of said metal and embedding said tab into said holder hole, so that the free end of said tab is wider than the end thereof attached to said metal plate or sheet and is wider than said hole in said holder at said holder surface.

14. A method of attaching a metal plate or sheet to a surface of a piece of wood including the steps of providing a tool having a base, a point, a front face, a rear face, two sides extending from said base to said point and a plane of symmetry through said point parallel to said sides, said point defining an edge lying in said plane of symmetry, said edge extending from said front face to said rear face and the length of said point edge being greater than the width of said sides; and thrusting said tool point through said metal plate or sheet into said piece of wood making a hole therein, cutting a tab of said metal and embedding said tab into said hole, so that the free end of said tab is wider than the end thereof attached to said metal plate or sheet and is wider than said hole in said piece of wood at said surface thereof.

* * * * *